United States Patent [19]
Trompf

[11] Patent Number: 5,583,968
[45] Date of Patent: Dec. 10, 1996

[54] NOISE REDUCTION FOR SPEECH RECOGNITION

[75] Inventor: Michael Trompf, Hemmingen, Germany

[73] Assignee: Alcatel N.V., Amsterdam, Netherlands

[21] Appl. No.: 219,219

[22] Filed: Mar. 29, 1994

[30] Foreign Application Priority Data

Mar. 29, 1993 [DE] Germany ............ 43 09 985.8

[51] Int. Cl.$^6$ ................ G10L 5/06; G10L 9/00
[52] U.S. Cl. ............ 395/2.41; 395/2.42; 395/23; 395/24
[58] Field of Search ................ 395/2.41, 2.42, 395/23, 24

[56] References Cited

U.S. PATENT DOCUMENTS

| | | | |
|---|---|---|---|
| 5,185,848 | 2/1993 | Aristuka et al. | 395/2 |
| 5,278,911 | 1/1994 | Bickerton | 381/43 |
| 5,461,699 | 10/1995 | Arbabi et al. | 395/23 |

FOREIGN PATENT DOCUMENTS

| | | | |
|---|---|---|---|
| 0487309 | 5/1992 | European Pat. Off. | G06K 9/66 |
| 2231698 | 11/1990 | United Kingdom | G10L 5/06 |

OTHER PUBLICATIONS

"A Cepstral Noise Reduction Multi-Layer Neural Network", H. Sorenson, ICASSP91, Toronto, Canada, May 14–17, 1991, pp. 933–936.

"Self-Structuring Neural Noise Reduction Model", H. Sorenson et al, University of Aalberg, Denmark, after May 1991, pp. 567–570.

"Noise Reduction Using Connectionist Models", S. Tamura et al, ICASSP '88, Osaka, Japan, Apr. 1988.

"Building Blocks for a Neural Noise Reduction Network for Robust Speech Recognition", M. Trompf, Proceedings of EUSIPCA 1992, Brussels, Belgium, Aug. 24–27, 1992.

A cepstral noise reduction multi-layer neural network Sorenson, ICASSP 91. 1991 International Conf. on Acoustics/14–17 May 1991, pp. 933–936.

Neural Network development for noise reduction in robust speech recognition Trompf, IJCNN International Joint Conf. on NN/7–11 Jun. 1992, pp. IV–722 to IV–727.

Improvements to the noise reduction Neural Network Tamura et al., ICASSP 90. 1990 International Conf. on Acoustics/3–6 Apr. 1990, pp. 825–828.

Primary Examiner—Ayaz R. Sheikh
Assistant Examiner—Richemond Dorvil
Attorney, Agent, or Firm—Ware, Fressola, Van Der Sluys & Adolphson

[57] ABSTRACT

A neural network for noise reduction for speech recognition in a noisy environment uses an algorithm for automatic network generation which automatically selects a suitable signal representation. Nodes may be added to the input layer of the neural network successively, with a new node being trained by calculating and minimizing a mapping error. A squared mapping error may be formed and the mapping error may be assigned a weight dependent on the importance of the vectors. In addition, a neural network that performs neural noise reduction by reducing, in a training phase, a mapping error between noise-free vectors at an output of the neural network and noise-reduced vectors at the output of the neural network using an iterative process, has the mapping error further reduced by additional information which is selected from a suitable signal representation at the input of the neural network.

14 Claims, 3 Drawing Sheets

NOISE REDUCTION FOR SPEECH RECOGNITION

TECHNICAL FIELD

The invention concerns a method for speech recognition in a noisy environment.

BACKGROUND OF THE INVENTION

Methods known until now obtain speech recognition in a noisy environment, e.g. by performing a noise reduction.

A method for noise reduction is e.g. a cepstral noise reduction by means of a multi-layer network based on LPC (Linear Predictive Coding) cepstral coefficients. Here, a noise reduction network performs nonlinear auto-associative mapping of a number of noisy cepstral coefficients into a number of noise-free cepstral coefficients in the cepstral range.

The average speech recognition rate is about 65% when the described noise reduction is performed ("A Cepstral Noise Reduction Multi-layer Neural Network; Helge B. D. Sorensen; ICASSP91; Toronto, Canada; May 14–17, 1991).

Another method of noise reduction in the cepstral range is based on a self-structuring universal network. Such a network makes noise reduction possible in the following three models. The first model performs a spectral analysis of the spoken language. The second model is a self-structuring neural noise reduction model SNNR (Self-structuring Neural Noise Reduction). The already noise-reduced output of the SNNR network is expanded by a so-called Hidden Control Neural Network (HCNN) ("A Self-structuring Neural Noise Reduction Model"; Helge B. D. Sorensen and Uwe Hartmann; University of Aalberg; Denmark, after May 1991).

An also known method of noise reduction utilizes so-called connectionist models. By means of an algorithm, a network consisting of four layers is trained to map noisy signals into noise-free signals. In this way, the network is in a position to learn noise reduction. It is also in a position to separate noisy signals, which are not part of the trained signals, from the noise. Such a network is also in a position to separate noisy signals, which are also not trained, from noise ("Noise Reduction Using Connectionist Models"; Shin'ichi Tamura and Alex Waibel; Osaka, Japan; ICASSP88; April 1988).

Furthermore, different network topologies and different variations of training algorithms are tested and optimized when using a neural network for noise reduction. This improves the robustness of speech recognition against environmental noise ("Building Blocks for a Neural Noise Reduction Network for Robust Speech Recognition"; Michael Trompf; Proceedings of EUSIPCA 1992; Brussels, Belgium; Aug. 24–27, 1992).

DISCLOSURE OF INVENTION

The invention has the task of developing a noise reduction method for speech recognition in noisy language.

According to the present invention, speech recognition in a noisy environment is carried out using a neural network performing a neural noise reduction by reducing, in a training phase, a mapping error between noise-free vectors at an output of the neural network and noise-reduced vectors at the output of the neural network using an iterative process, and with the mapping error being further reduced by additional information which is selected from a suitable signal representation at the input of the neural network.

In accordance with a second aspect of the present invention, a neural network for speech recognition in a noisy environment uses an algorithm for automatic network generation which automatically selects a suitable signal representation.

An advantage of the present invention is that robust speech recognition of noisy language can be performed with the method. Robustness means the insensitivity of the speech recognition to interference against trained, but also against untrained noise. Robustness also comprises the correct recognition of untrained words in a noisy environment. The method used here leads to very robust speech recognition through improved noise reduction.

Another advantage of this method consists in that the neural network used for neural noise reduction requires a shorter network development time.

In further accord with the first aspect of the present invention, the mapping error is formed as a squared mapping error. This special error calculation method, i.e., the formation of a quadratic mapping error, proves to be particularly advantageous.

In still further accord with the first aspect of the present invention, the mapping error is assigned a weight which is dependent on the importance of the vectors for the speech recognition. In this way, weighting of the mapping error is performed for individual vectors. The individual weighted mapping errors lead to the total mapping error.

In still further accord with the first aspect of the present invention, a suitable topology of the neural network is defined by selecting suitable signal representations. In this way, the selection of suitable signal representations determines a suitable topology of the neural network.

According to the second aspect of the present invention, the neural network successively adds nodes to an input layer of the neural network, with a new node being trained by calculating and minimizing a mapping error. This explains how the neural network is trained. Nodes are added to an input layer of the neural network, by calculating and minimizing a mapping error between a noise-reduced vector and a noise-free vector. Enlarging the input layer makes an enlargement of the input representations possible.

Still further in accordance with the second aspect of the present invention, a squared mapping error is formed as the mapping error. According to this teaching, the formation of the quadratic error is the preferred error advising method.

In still further accord with the second aspect of the present invention, the mapping error is assigned a weight which is dependent on the importance of the vectors for the speech recognition. According to this teaching, weighting of the mapping error is performed for individual vectors.

These and other objects, features and advantages of the present invention will become more apparent in light of the following detailed description of a best mode embodiment thereof, as illustrated in the accompanying drawing

BEST MODE FOR CARRYING OUT THE INVENTION

Figure 1:
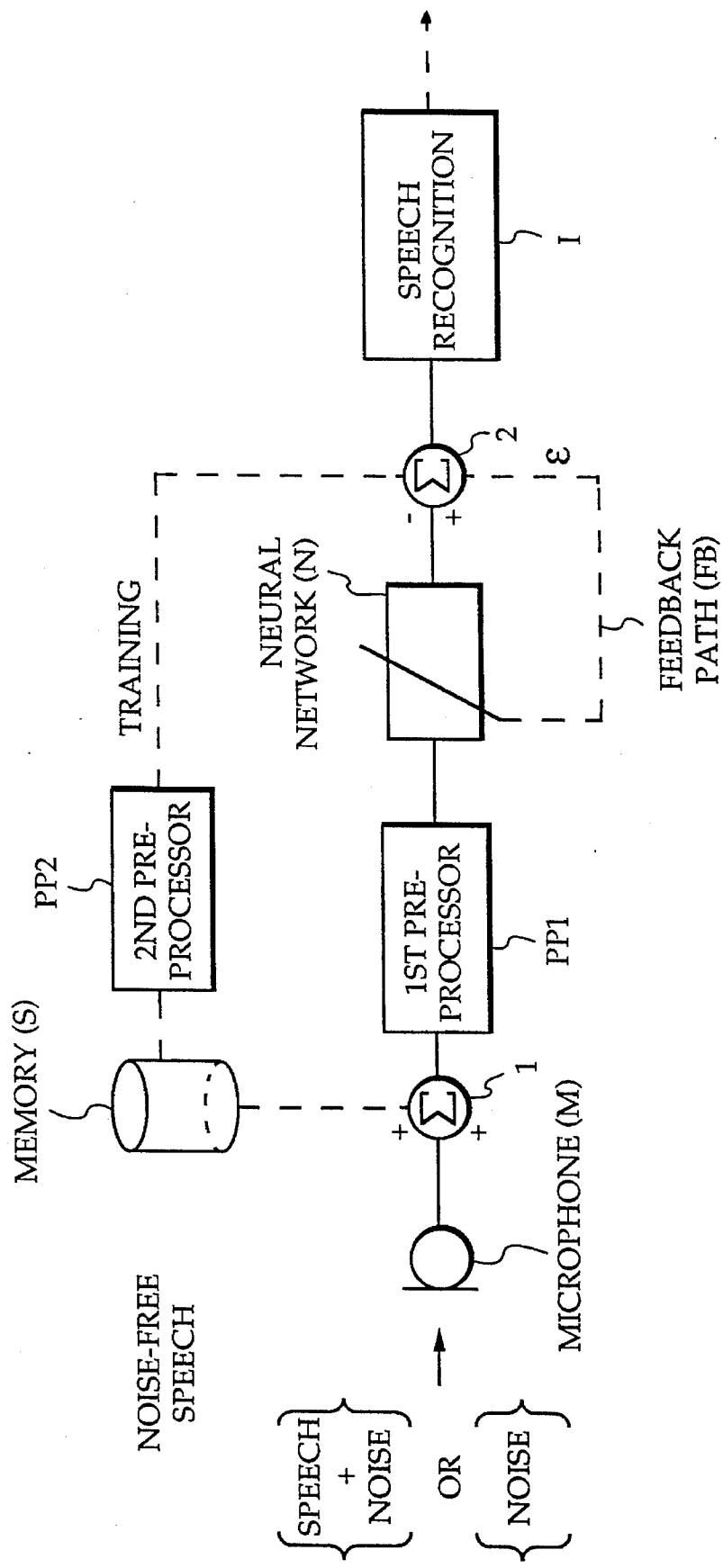
FIG. 1 is a block circuit diagram of a speech recognition device that carries out the method according to the invention.

In the following, the method according to the invention of speech recognition of language in a noisy environment is explained by means of FIG. 1.

A speech recognition device that is in a position to carry out the method according to the invention, uses noise reduction, which is performed by means of a neural network.

Speech and noise are supplied to the speech recognition device by a microphone M. The noisy speech corresponds to noisy speech signals and is so called in the following. In the following, pure noise-free speech will be called a noise-free speech signal. The microphone M is connected to a first preprocessing installation PP1 via a first adder 1. The role of the first adder 1 will be described later. The first preprocessing installation PP1 is connected to a neural network N, which performs the neural noise reduction. The neural network N is connected to a speech recognition unit I via a second adder 2. The adders 1, 2 are used during the training process, according to the invention, as described below.

During use of the speech recognition block (I), after the to-be-described training, the noisy speech signals are supplied to the preprocessing installation PP1 by the microphone M. The speech recognition block (I) uses standard word recognizer e.g., using Dynamic Time Warping (DTW).

The first preprocessing installation PP1, e.g., can perform an LPC (Linear Predictive Coding) cepstral analysis, as already known in the speech processing art.

Such an LPC cepstral analysis low-pass filters the noisy speech signals at a determined frequency, e.g. 3.4 kHz. Subsequently the LPC cepstral coefficients are formed. Ten to fifteen coefficients are usually formed.

In this way, the first preprocessing installation PP1 forms a series of noisy vectors from the noisy speech signals, also called characteristic vectors. Then, the noisy speech signals preprocessed in this manner, in other words the noisy vectors, are supplied to the neural network N. The neural network N performs a noise reduction.

Noise reduction means the mapping of noisy into noise-free vectors.

The device described so far represents the speech recognition with which noise reduction can be undertaken.

The neural network N must be trained to perform this noise reduction, in other words the mapping.

Neural networks are pretrained, i.e., prior to their use, as in this instance, to recognize speech in a noisy environment; the neural network is placed in the position of recognizing a determined vocabulary pretrained in a noise-free environment and also in a noisy environment. In addition, the neural network is placed in a position to recognize certain noises as noise and not an undesirable interference.

In general, a neural network is only pretrained for a few words and noises. Such a network is called a minimum network.

If the neural network is used during the training phase as a neural network N for noise reduction, as in this instance, it is able to "learn" in the meantime, thus can be further trained. The topology of the minimum network consists of a few interconnected nodes. Further nodes are added if the neural network "learns". This takes place e.g. by means of a CASCADE algorithm. Starting with a minimum network, further nodes are trained and added successively with a cascade algorithm. The training takes place by an error comparison between specified and actual values, for example. If the values are identical, the node is considered trained and is added to the network. Matching the actual and the specified value takes place by means of an iterative process.

To train the neural network N, as shown by the connection of dashed lines in FIG. 1, according to the present invention, the speech recognition device additionally contains a memory S in which noise-free speech signals are stored. The memory S is connected to the second adder 2 by a second preprocessing installation PP2. The second preprocessing installation PP2 works with the same LPC cepstral analysis method as the first preprocessing installation PP1. Accordingly, noise-free vectors are located at the output of the preprocessing installation (PP2).

The memory S is also connected to the first adder 1.

The second adder 2 contains another connection, a feedback path A to the neural network N.

In particular, with reference to FIG. 3, the noise reduction and the training take place as follows:

A sequence of noisy vectors is supplied to the neural network N by the first preprocessor (PP1), which in turn receives summed speech-free noise signals (from the microphone (M) or equivalent) and noise-free speech signals (from the memory (S) or equivalent). A first neural noise reduction is performed, by mapping the noisy vectors from the first preprocessor into noise-free vectors. Thus, a noise-reduced vector is present at the output of the neural network, which can be noise-free in the ideal case.

The second preprocessing installation (PP2) also makes noise-free vectors available for the second adder 2. The second adder 2 adds the vectors from the neural network and the second preprocessor and forms a mapping error ($\epsilon$) between noise-free vector and noise-reduced vector.

For example, the mapping error can be calculated as a quadratic mapping error. The quadratic error is explicitly calculated as an average of several noisy and noise-free vectors.

In addition, weighting can be undertaken. Vectors that are "important" for the speech recognition are weighted more with the pertinent mapping error. "Important" vectors means those in the audible frequency range, which are therefore significant for the speech recognition.

If the mapping error is not zero, an approach to zero is attempted by means of an iterative process. Additional information is selected from suitable signal representations at the input of the neural network, to keep the mapping error as small as possible at the start of the iterative process. Suitable signal representations can mean those with not too extensive distortions caused by noise, e.g., not greater than a selected distortion level. Or, less than another selected distortion level. Redundant signals can also be found among the number of input signals at the neural network input, so that representative signals can be selected. Additional information is, e.g., context information, derivations or extraction procedures for determined characteristics. A comparison of specified and actual values is made after the first iteration step.

A feedback path (FB) makes a second iterative step possible. Again, a comparison of specified and actual values is made. If the mapping error is larger, an iteration step with different coefficients is used. If the mapping error was minimized, a new iteration step is undertaken for the purpose of renewed minimization. The noise reduction ends if the mapping error is zero, or the mapping error can no longer be reduced, and speech recognition can then take place in the speech recognition unit I.

The noise-reduced value obtained with the iterative process is now considered trained into the neural network N, and a node is added to the network's topology.

Figure 2:
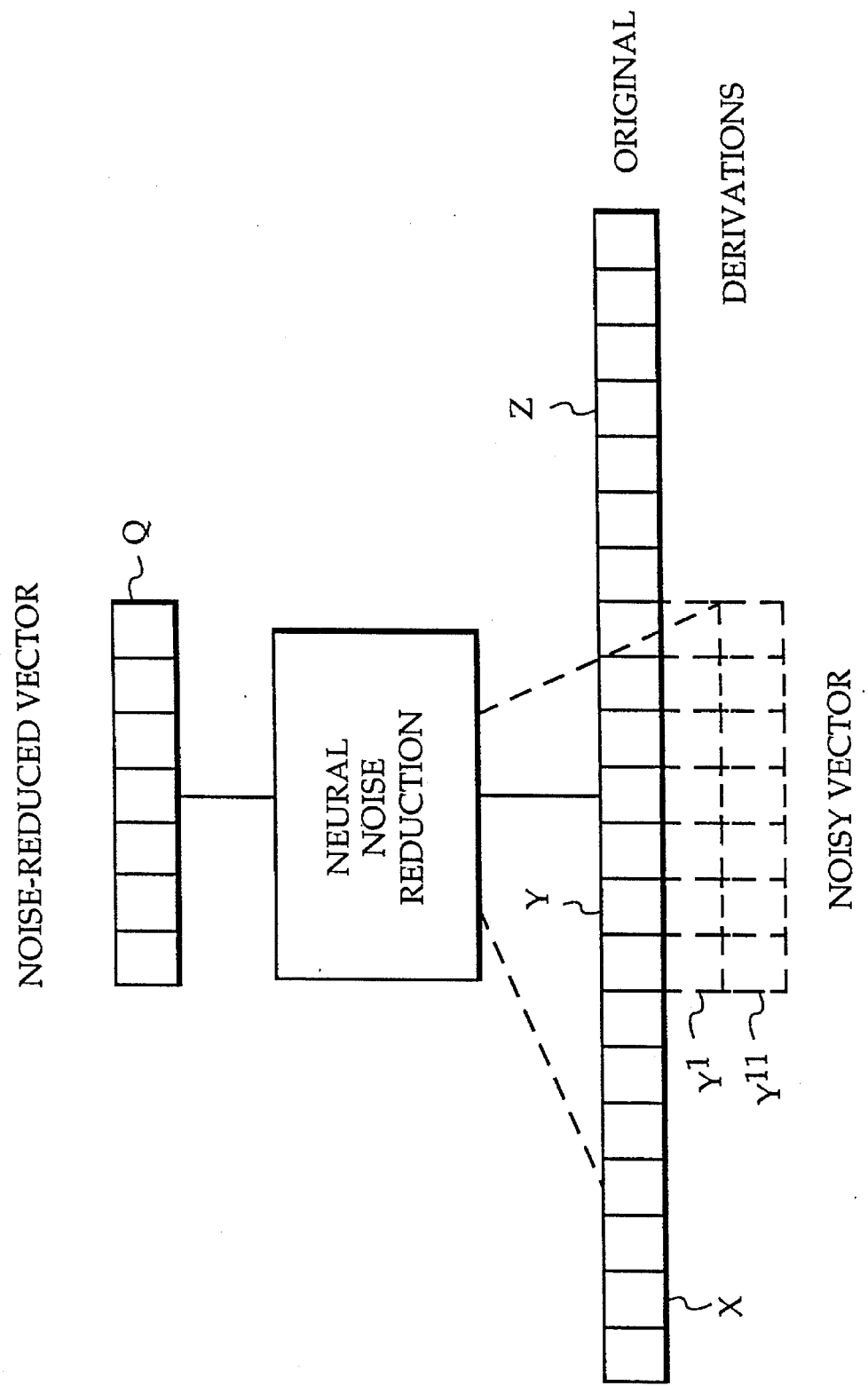
FIG. 2 is a schematic depiction of the neural network for noise reduction.

In the following, the neural network for the neural noise reduction is explained in greater detail by means of FIG. 2.

After the first preprocessing installation PP1, the noisy speech is available for the neural noise reduction in the form of noisy vectors. A differentiation is made between noisy vectors Y, which are present in the neural network N at the time of the neural noise reduction, and which are identified by solid lines, and noisy vectors X, which existed in the neural network at a previous point in time. These vectors X are identified by broken lines.

A first derivation Y' and a second derivation Y" can be formed, e.g., from the presently existing noisy vectors Y.

These derivations Y' and Y" are identified by dotted lines. To produce noise-reduced vectors Q from the noisy vectors Y by means of the neural noise reduction, the present vector Y, its derivations Y' and Y" and the old vector X are available for the neural noise reduction.

In order to form conclusions about the future neural noise reduction of noisy vectors, all the previously mentioned information that could be drawn from the noise reduction is used to form conclusions about future noisy vectors Z, and to simplify the noise reduction. The future noisy vectors Z are indicated by dash-dotted lines. The simplification of noise reduction includes a simplification of the speech recognition of language in a noisy environment.

Speech recognition may be carried out after training, as shown in FIG. 1, without the blocks connected with the dashed lines and without the need for adders. In that case, both speech and noise signals are provided to the microphone (M) for recognition of the speech signals.

Figure 3:
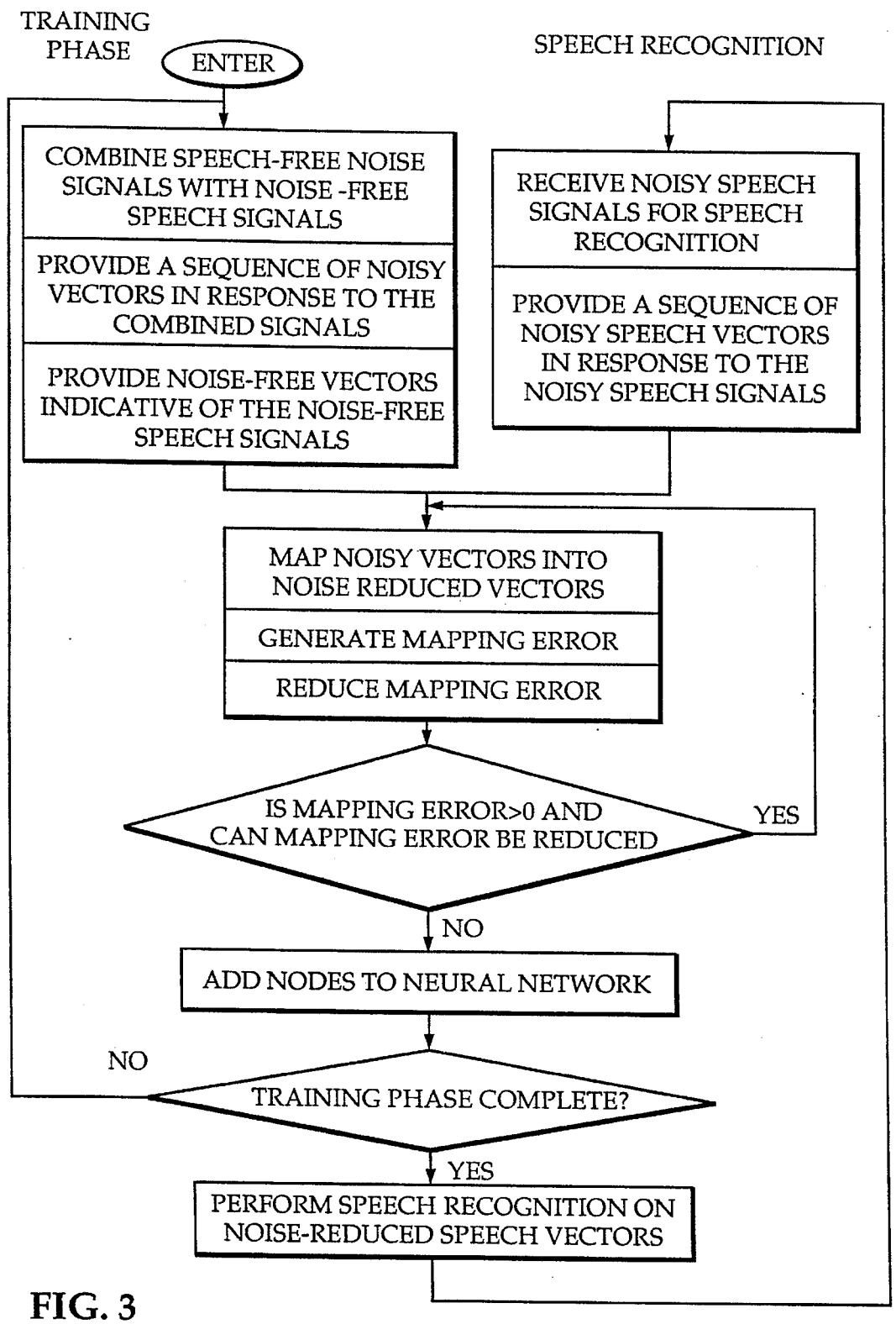
FIG. 3 is a logic flow diagram of the method according to the invention.

The method of the invention, as described above, may be carried out in accordance with the logic flow diagram of FIG. 3.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A method for speech recognition in a noisy environment using a neural network, said method comprising the steps of:

performing a training phase prior to speech recognition including:
(a) combining speech-free noise signals with noise-free speech signals;
(b) providing a sequence of noisy vectors in response to said combined speech-free noise signals and noise-free speech signals;
(c) providing noise-free vectors indicative of said noise-free speech signals;
(d) performing an iterative neural noise reduction on said noisy vectors including:
(1) mapping said noisy vectors into noise-reduced vectors;
(2) generating a mapping error as the difference between said noise-reduced vectors and said noise-free vectors;
(3) reducing said mapping error by selecting additional information from a suitable signal representation at an input of the neural network; and
(4) performing, in iterative steps, a further neural noise reduction on said noise-reduced vectors by reducing said mapping error if said mapping error is not equal to zero or can be reduced;
(e) adding nodes to a topology of the neural network containing said noise-reduced vectors; and performing speech recognition from noisy speech signals including:
(f) providing a sequence of noisy speech vectors in response to said noisy speech signals;
(g) performing an iterative neural noise reduction on said noisy speech vectors including:
(1) mapping said noisy speech vectors into noise-reduced speech vectors;
(2) generating a speech mapping error as the difference between said noise-reduced speech vectors and said noise-reduced vectors contained in said nodes;
(3) reducing said mapping error by selecting additional information from a suitable signal representation at said input of the neural network;
(4) performing, in iterative steps, a further neural noise reduction by reducing said speech mapping error if said mapping error is not equal to zero or can be reduced; and
(h) adding nodes to a topology of the neural network indicative of said noise-reduced speech vectors; and
(i) performing speech recognition on said noise-reduced speech vectors.

2. A method for speech recognition as claimed in claim 1 wherein the steps of generating a mapping error and generating a speech mapping error include forming a squared mapping error.

3. A method as claimed in claim 1 further including the steps of;

assigning a weight to said mapping error, said weight being dependent on the importance of said noisy vectors for the speech recognition; and assigning a weight to said mapping error, said weight being dependent on the importance of said noisy speech vectors for speech recognition.

4. A method as claimed in claim 1 further including the step of defining a suitable topology of the neural network by selecting suitable signal representations.

5. A system for performing speech recognition in a noisy environment using a neural network, comprising:

a memory for storing noise-free speech signals;

means for providing speech-free noise signals;

means for combining said noise-free speech signals with said speech-free noise signals;

means responsive to said combined speech-free noise signals and noise-free speech signals for providing a sequence of noisy vectors;

means responsive to said noise-free speech signal for providing a sequence of noise free vectors;

wherein during a training phase prior to speech recognition, said neural network performs a neural noise reduction wherein said noisy vectors are mapped into noise-reduced vectors;

means responsive to said noise-reduced vectors and said noise free vectors for providing a mapping error;

wherein said neural network is responsive to said mapping error for performing, in iterative steps, further neural noise reductions on said noise-reduced vectors if said mapping error is not equal to zero or can be reduced; and wherein said neural network adds nodes to a topology of the neural network for storing said noise-reduced vectors.

6. A system according to claim 5, further comprising:

means for providing noisy speech signals;

wherein said means responsive to said combined speech-free noise signals and noise-free speech signals is further responsive to said noisy speech signal for providing a sequence of noisy speech vectors;

wherein during speech recognition, said neural network performs a neural noise reduction wherein said noisy speech vectors are mapped into noise-reduced speech vectors;

wherein said neural network generates a speech mapping error in response to said noise-reduced speech vectors and said noise-reduced vectors stored in said nodes;

wherein said neural network performs, in iterative steps, futher neural noise reductions on said noise-reduced speech vectors if said mapping error is not equal to zero or can be reduced; and means for performing speech recognition on said noise-reduced speech vectors.

7. A system according to claim 6, wherein said neural network adds nodes to said topology of the neural network for storing said noise-reduced speech vectors.

8. A system as claimed in claim 7 wherein said neural network successively adds nodes to an input layer of the neural network, and wherein each new node is trained by calculating and minimizing a corresponding mapping error or speech mapping error.

9. A system as claimed in claim 8 wherein said mapping error and said speech mapping error are formed as a squared mapping error.

10. A system as claimed in claim 8, wherein said mapping error is assigned a weight which is dependent on the importance of said noisy vectors for the speech recognition; and wherein said speech mapping error is assigned a weight which is dependent on the importance of said noisy speech vectors for the speech recognition.

11. A system according to claim 6, wherein said mapping error is further reduced by additional information which is selected from a suitable signal representation at the an input of the neural network.

12. A system as claimed in claim 5 wherein said neural network successively adds nodes to an input layer of the neural network, and wherein each new node is trained by calculating and minimizing a corresponding mapping error.

13. A system as claimed in claim 5 wherein said mapping error is assigned a weight which is dependent on the importance of said noisy vectors for the speech recognition.

14. A system according to claim 5, wherein said mapping error is further reduced by additional information which is selected from a suitable signal representation at the an input of the neural network.

* * * * *

UNITED STATES PATENT AND TRADEMARK OFFICE
CERTIFICATE OF CORRECTION

PATENT NO. : 5,583,968
DATED : Dec. 10, 1996
INVENTOR(S) : Michael Trompf

It is certified that error appears in the above-indentified patent and that said Letters Patent is hereby corrected as shown below:

On the title page, item [56] "Aristuka et al." should read --Aritsuka et al.--

Column 6, line 43 (claim 3), "said mapping error" should read --said speech mapping error--

Signed and Sealed this

Eighteenth Day of March, 1997

Attest:

BRUCE LEHMAN

*Attesting Officer*    *Commissioner of Patents and Trademarks*